(12) United States Patent
Aston et al.

(10) Patent No.: US 11,536,352 B2
(45) Date of Patent: Dec. 27, 2022

(54) DRIVE TRAIN LINKAGE AND METHOD THEREFOR

(71) Applicant: The Boeing Company, Chicago, IL (US)

(72) Inventors: Richard W. Aston, Brea, CA (US); Jazzmin P. Martinez, Los Angeles, CA (US); Michael J. Langmack, Huntington Beach, CA (US); Emily C. Woods, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 16/142,877

(22) Filed: Sep. 26, 2018

(65) Prior Publication Data

US 2020/0096081 A1   Mar. 26, 2020

(51) Int. Cl.
*F16H 21/44*     (2006.01)
*F16C 7/06*      (2006.01)

(52) U.S. Cl.
CPC .............. *F16H 21/44* (2013.01); *F16C 7/06* (2013.01)

(58) Field of Classification Search
CPC ....... F16H 55/283; F16H 21/44; B62D 19/00; B62D 7/00; B62D 7/20; F16C 7/06
See application file for complete search history.

(56) References Cited

U.S. PATENT DOCUMENTS

| | | | | | |
|---|---|---|---|---|---|
| 2,616,747 | A | * | 11/1952 | Ratigan | E21B 19/06 294/81.5 |
| 2,903,283 | A | * | 9/1959 | Sweetland | F16G 11/12 403/78 |
| 3,013,437 | A | * | 12/1961 | Harding | F16H 21/54 74/96 |
| 3,295,764 | A | * | 1/1967 | Geary | F42B 10/665 239/265.41 |
| 3,351,372 | A | * | 11/1967 | Marks | E21B 19/04 294/81.5 |
| 3,786,695 | A | * | 1/1974 | Barrett, Jr. | F16C 7/06 74/586 |
| 3,938,822 | A | * | 2/1976 | Guerriero | B60G 21/0551 280/86.758 |
| 4,128,208 | A | * | 12/1978 | Ryan | F02K 1/1207 239/265.39 |
| 4,191,280 | A | * | 3/1980 | Copperwheat | B60D 1/249 188/300 |
| 4,232,978 | A | * | 11/1980 | Cohen | F16B 7/06 403/317 |

(Continued)

*Primary Examiner* — Zakaria Elahmadi
(74) *Attorney, Agent, or Firm* — Perman & Green, LLP

(57) ABSTRACT

A drive train linkage includes a drive arm having a drive arm pivot axis, a driven arm having a driven arm pivot axis, at least one first coupling member extending between and being rotatably coupled to each of the drive arm and driven arm, and at least one second coupling member extending between and being rotatably coupled to each of the drive arm and driven arm so that the at least one second coupling member opposes the at least one first coupling member, where the at least one first coupling member and the at least one second coupling member are coupled to both the drive arm and the driven arm so to form a substantially zero mechanical deadband coupling between the drive arm and the driven arm.

20 Claims, 10 Drawing Sheets

(56) References Cited

U.S. PATENT DOCUMENTS

| | | | | |
|---|---|---|---|---|
| 4,778,194 A * | 10/1988 | Koch | | A01B 59/004 172/448 |
| 5,454,153 A * | 10/1995 | Noel | | B64C 27/72 29/281.1 |
| 5,505,106 A * | 4/1996 | Herman | | B62D 17/00 384/276 |
| 5,522,281 A * | 6/1996 | Herman | | B62D 17/00 384/276 |
| 5,529,316 A * | 6/1996 | Matti | | B62D 7/16 280/93.51 |
| 5,765,957 A * | 6/1998 | Connell | | F16C 7/06 403/44 |
| 6,357,954 B1 * | 3/2002 | Timoney | | B62D 7/16 403/119 |
| 6,520,709 B1 * | 2/2003 | Mosing | | B66C 1/66 403/305 |
| 6,622,796 B1 * | 9/2003 | Pietras | | E21B 21/106 166/379 |
| 6,802,275 B2 * | 10/2004 | Schmidt | | F16C 11/0604 114/361 |
| 6,902,341 B1 * | 6/2005 | Rauschert | | F16C 11/0623 403/301 |
| 6,913,497 B1 * | 7/2005 | Ahlswede | | B63H 20/12 440/63 |
| 7,207,854 B1 * | 4/2007 | Anderson, Jr. | | B63H 5/125 440/53 |
| 7,584,621 B2 * | 9/2009 | Spitzer | | F01D 25/162 60/39.5 |
| 7,788,993 B2 * | 9/2010 | Wood | | F16C 7/06 74/579 R |
| 7,798,503 B2 * | 9/2010 | McLaughlin | | B60G 7/003 280/93.51 |
| 8,770,602 B1 * | 7/2014 | Belleau | | B62D 7/20 280/93.51 |
| 9,624,966 B1 * | 4/2017 | Obleman | | H01Q 1/084 |
| 9,695,854 B2 * | 7/2017 | Gutta | | F16B 7/06 |
| 9,732,567 B2 * | 8/2017 | Hayes | | E21B 19/06 |
| 9,988,083 B1 * | 6/2018 | Smith | | F16C 11/0695 |
| 10,767,572 B2 * | 9/2020 | Paul | | F02B 75/045 |
| 2002/0187041 A1 * | 12/2002 | Arnold | | B64C 27/605 416/25 |
| 2003/0074778 A1 * | 4/2003 | Takeuchi | | B62D 7/20 29/456 |
| 2004/0005824 A1 * | 1/2004 | Zeiger | | B63H 20/12 440/63 |
| 2007/0166162 A1 * | 7/2007 | Podgurski | | B64C 27/605 416/114 |
| 2008/0240848 A1 * | 10/2008 | Rauschert | | F16C 11/06 403/122 |
| 2011/0169241 A1 * | 7/2011 | Sheriff | | B60G 9/00 280/124.117 |
| 2012/0184160 A1 * | 7/2012 | Dudra | | F16C 7/06 440/63 |
| 2013/0239454 A1 * | 9/2013 | Szechenyi | | F16H 21/44 43/3 |
| 2014/0305072 A1 * | 10/2014 | Gill | | F16F 9/00 52/831 |
| 2016/0003290 A1 * | 1/2016 | Trotter | | F16C 7/06 403/56 |
| 2016/0298691 A1 * | 10/2016 | Dowie | | F16C 7/06 |
| 2016/0305516 A1 * | 10/2016 | Yang | | F16H 21/44 |
| 2017/0233908 A1 * | 8/2017 | Kroczynski | | D04C 3/42 87/48 |
| 2017/0328491 A1 * | 11/2017 | Malik | | F16H 21/44 |
| 2018/0180129 A1 * | 6/2018 | Huck | | B61D 7/18 |
| 2019/0186353 A1 * | 6/2019 | Jung | | F02B 75/047 |
| 2019/0315452 A1 * | 10/2019 | Labry | | B60T 11/18 |
| 2020/0010114 A1 * | 1/2020 | Gordon | | F16C 9/04 |

\* cited by examiner

DRIVE TRAIN LINKAGE AND METHOD THEREFOR

BACKGROUND

1. Field

The exemplary embodiments generally relate to drive trains and more particularly to drive train linkages.

2. Brief Description of Related Developments

Generally, drive trains that couple an input shaft and an output shaft of a transmission system include gear trains, belts and pulleys, chains and sprockets, or other drive trains that may introduce backlash through the transmission. This backlash may generate motion within the transmission, even when the transmission is at rest (e.g., not being driven). The backlash may also increase over time as the gears, chains, sprockets, belts, and pulleys wear.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a drive train linkage comprising: a drive arm having a drive arm pivot axis; a driven arm having a driven arm pivot axis; at least one first coupling member extending between and being rotatably coupled to each of the drive arm and driven arm; and at least one second coupling member extending between and being rotatably coupled to each of the drive arm and driven arm so that the at least one second coupling member opposes the at least one first coupling member; where the at least one first coupling member and the at least one second coupling member are coupled to both the drive arm and the driven arm so to form a substantially zero mechanical deadband coupling between the drive arm and the driven arm.

Another example of the subject matter according to the present disclosure relates to a drive train linkage comprising: a drive arm having a drive arm pivot axis; a driven arm having a driven arm pivot axis, the drive arm pivot axis and the driven arm pivot axis defining longitudinal axis of the drive train linkage; and a coupling system having but two coupling members, each of the but two coupling members extending between and being coupled to both the drive arm and driven arm, where the but two coupling members form a substantially zero mechanical deadband coupling between the drive arm and the driven arm.

Still another example of the subject matter according to the present disclosure relates to a method for transferring torque between a torque source and a torque receiver with a drive train linkage, the method comprising: coupling a drive arm to the torque source, where the drive arm includes a drive arm pivot axis; coupling a driven arm to the torque receiver, where the driven arm includes a driven arm pivot axis; coupling the drive arm to the driven arm with at least one first coupling member so that the at least one first coupling member extends between and is rotatably coupled to each of the drive arm and driven arm; coupling the drive arm to the driven arm with at least one second coupling member so that the at least one second coupling member extends between and is rotatably coupled to each of the drive arm and driven arm; and adjusting a length of one or more of the at least one first coupling member and the at least one second coupling member so as to form a substantially zero mechanical deadband coupling between the drive arm and the driven arm.

BRIEF DESCRIPTION OF THE DRAWINGS

Figure 1:
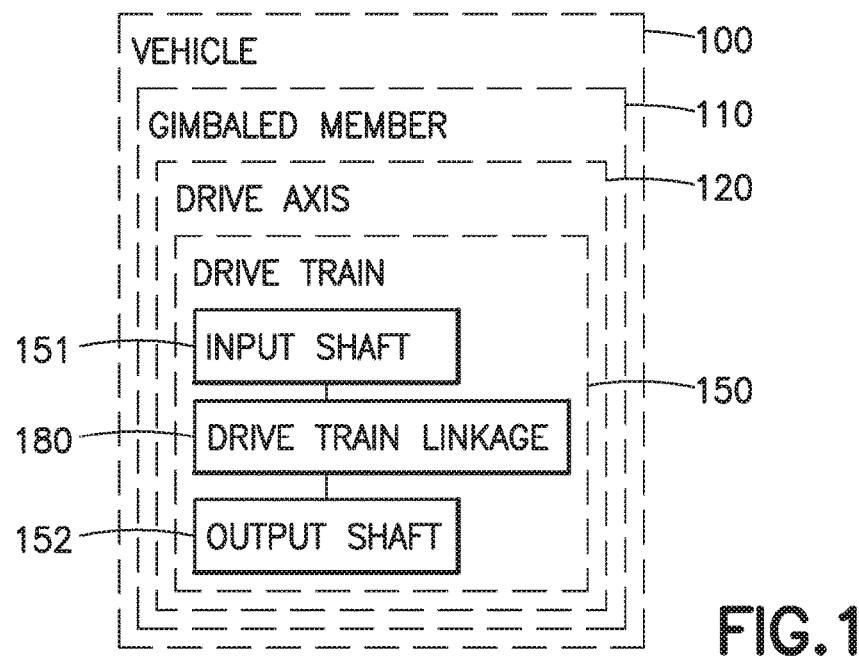
Figure 2:
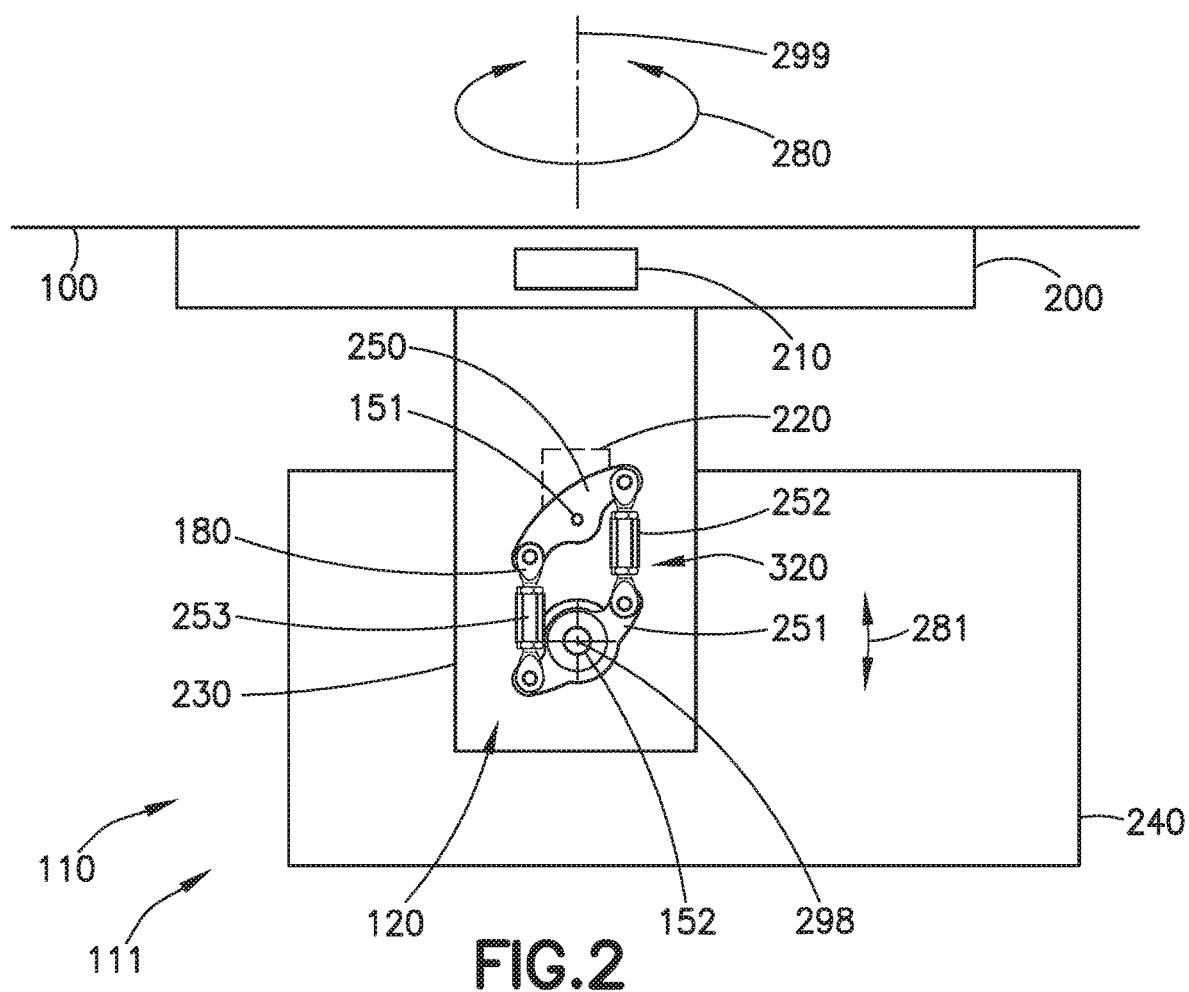
Figure 3:
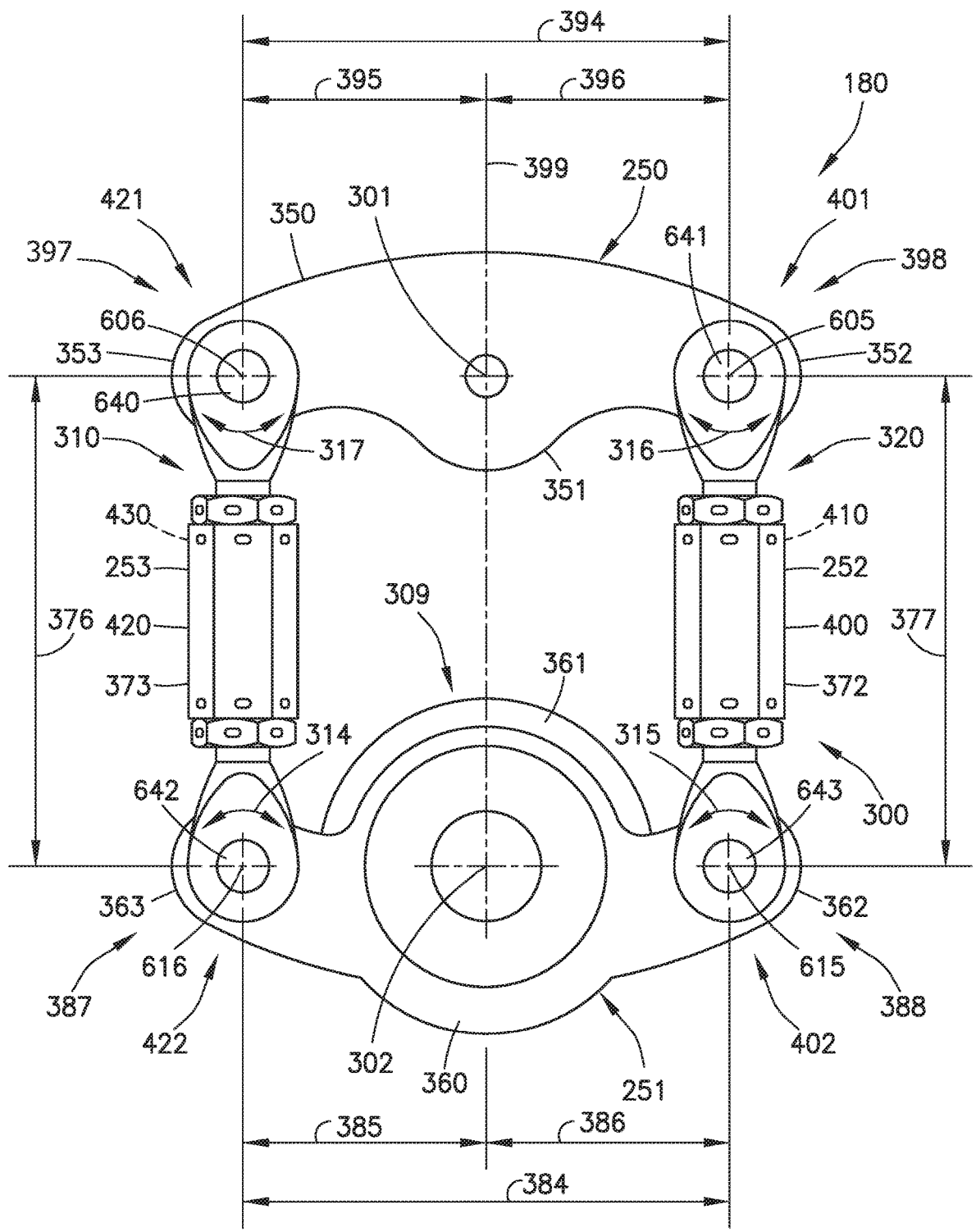
Figure 4:
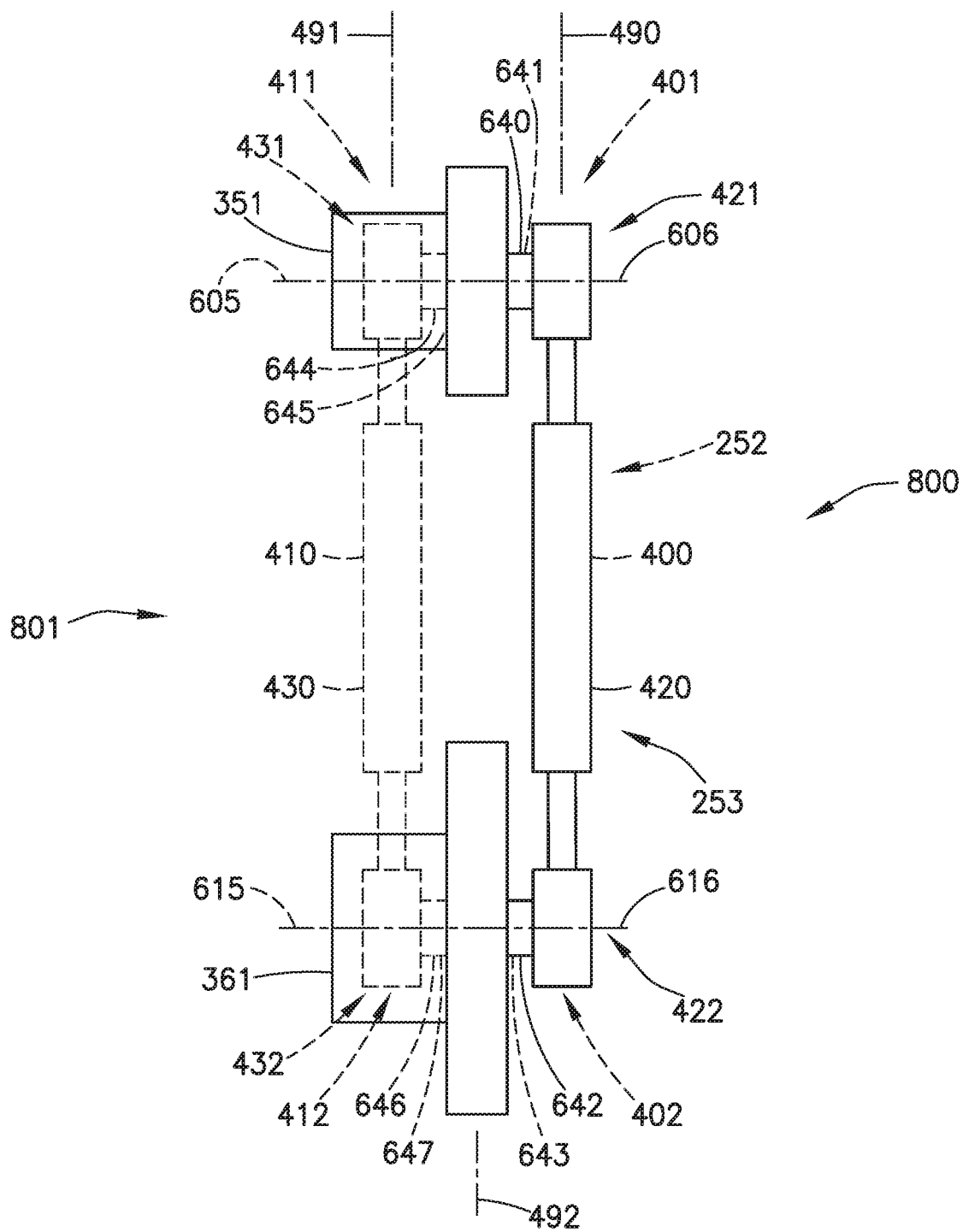
Figure 5:
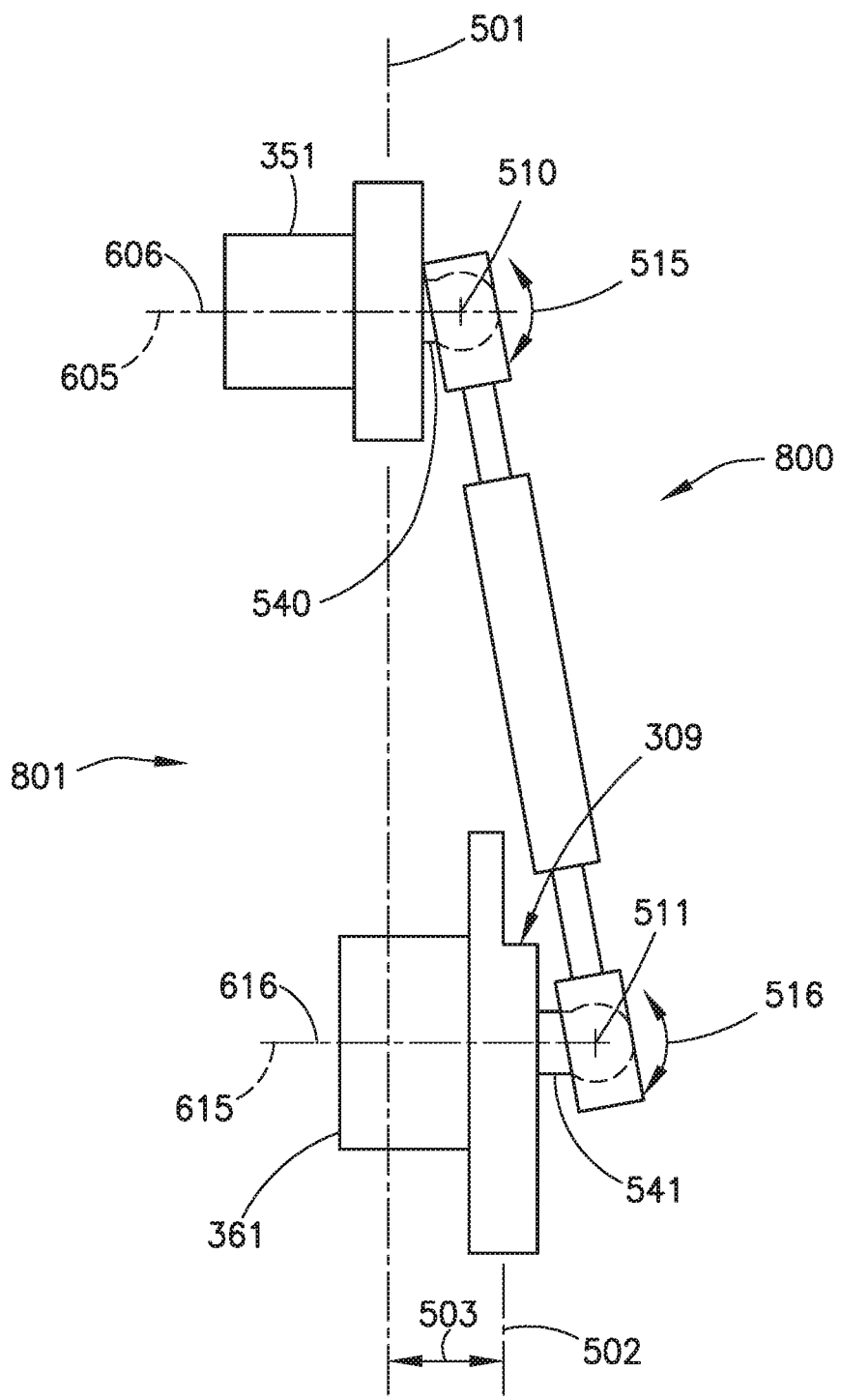
Figure 6A:
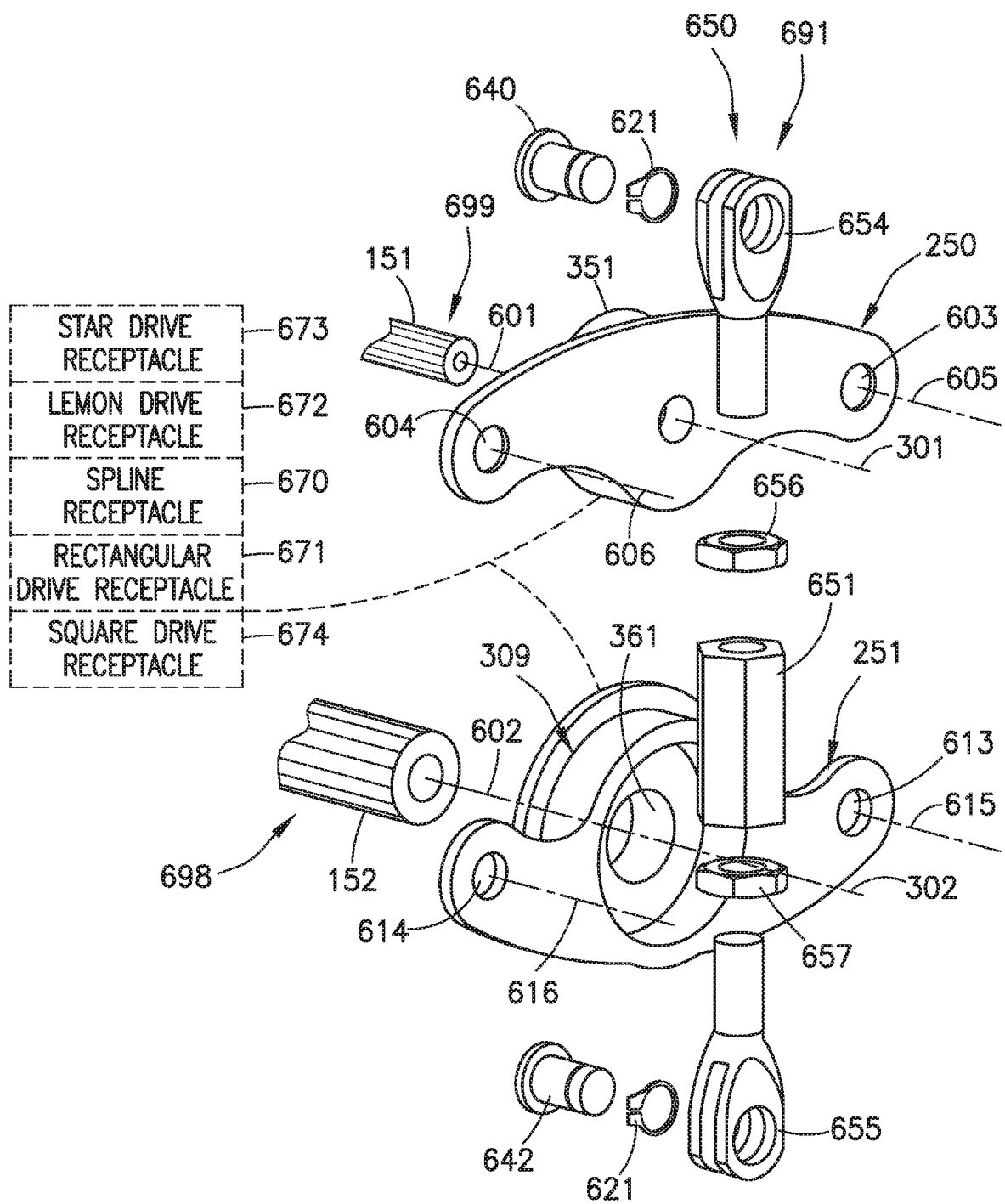
Figure 6B:
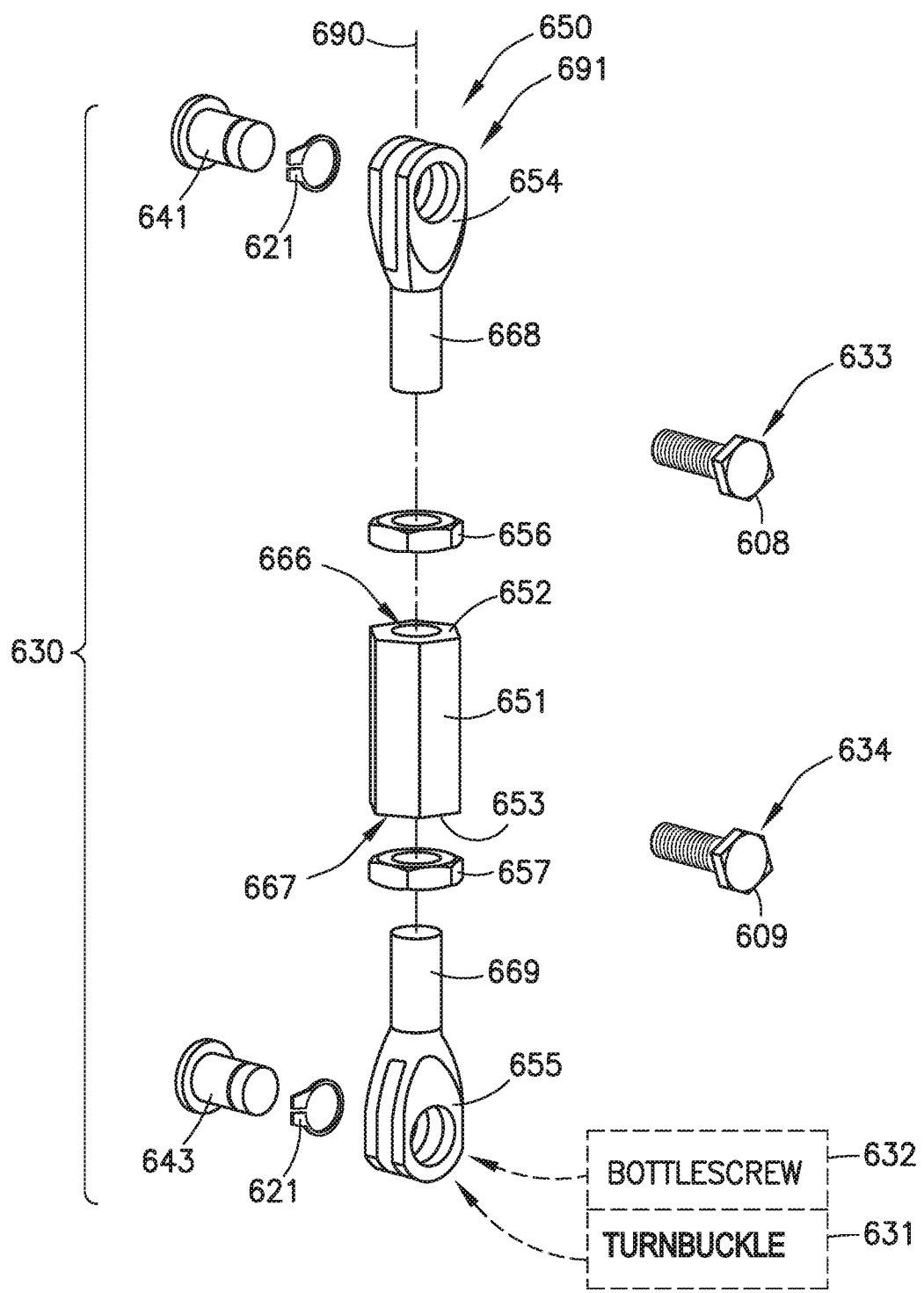
Figure 7:
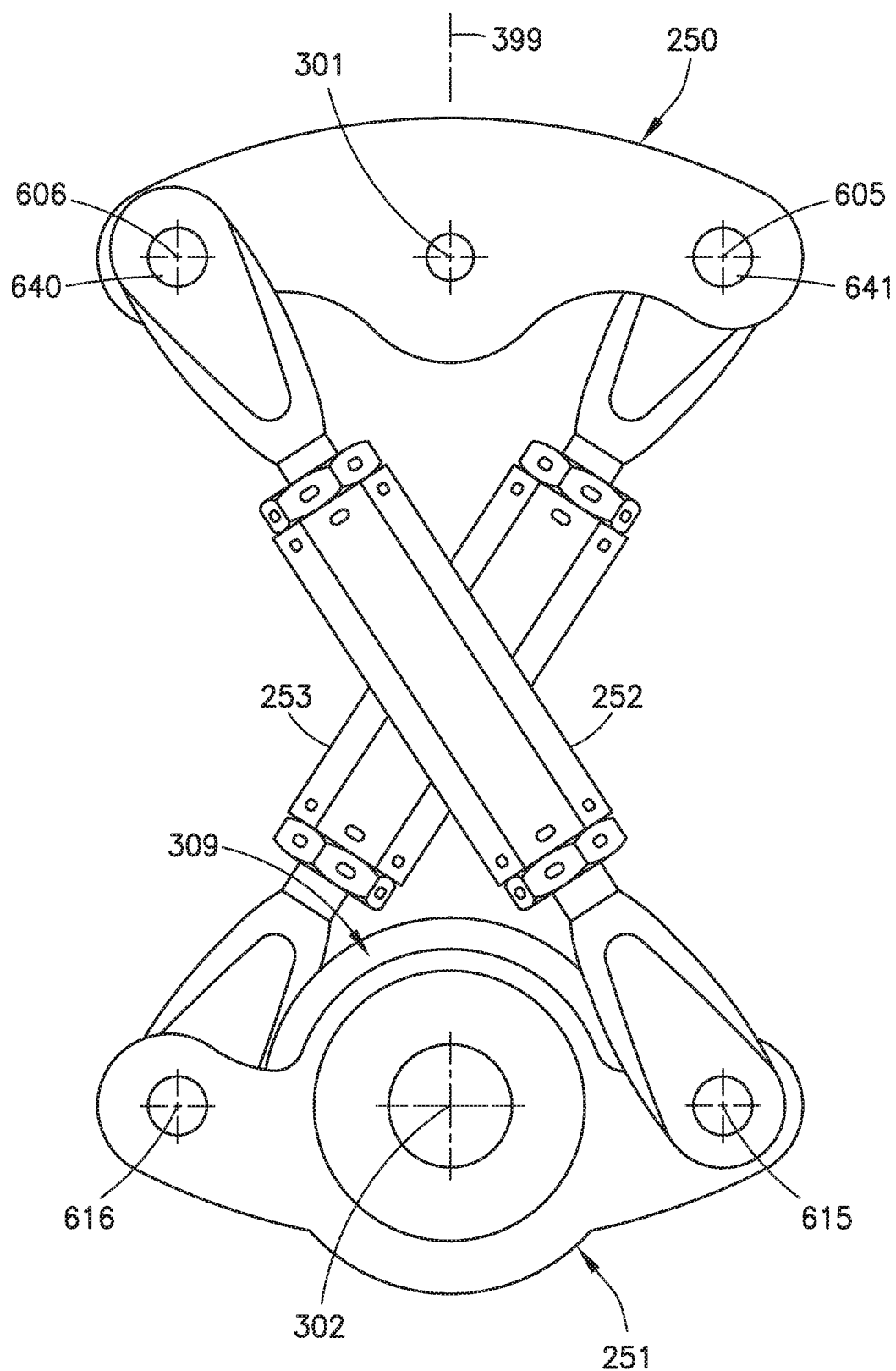
Figure 8:
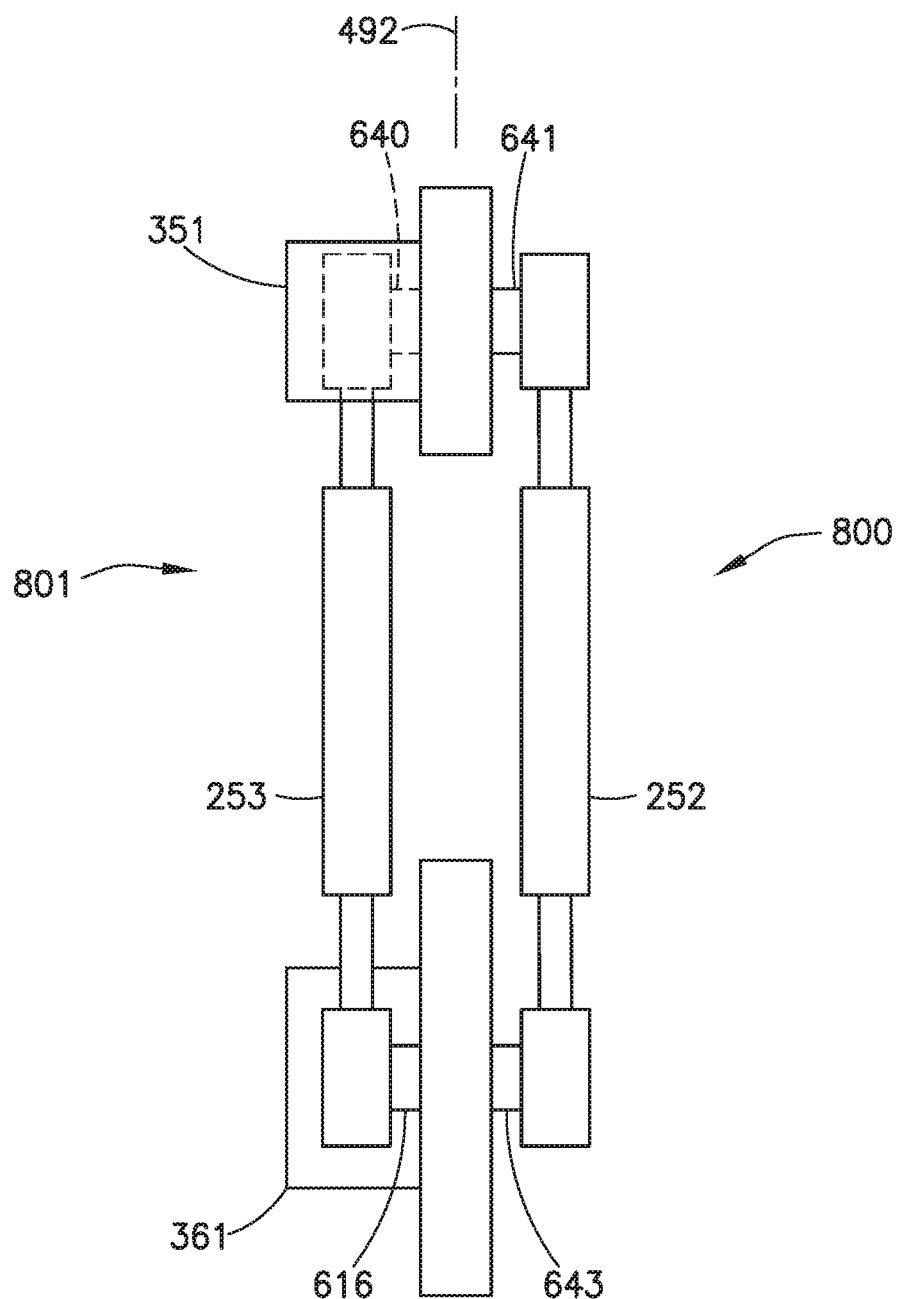
Figure 9:
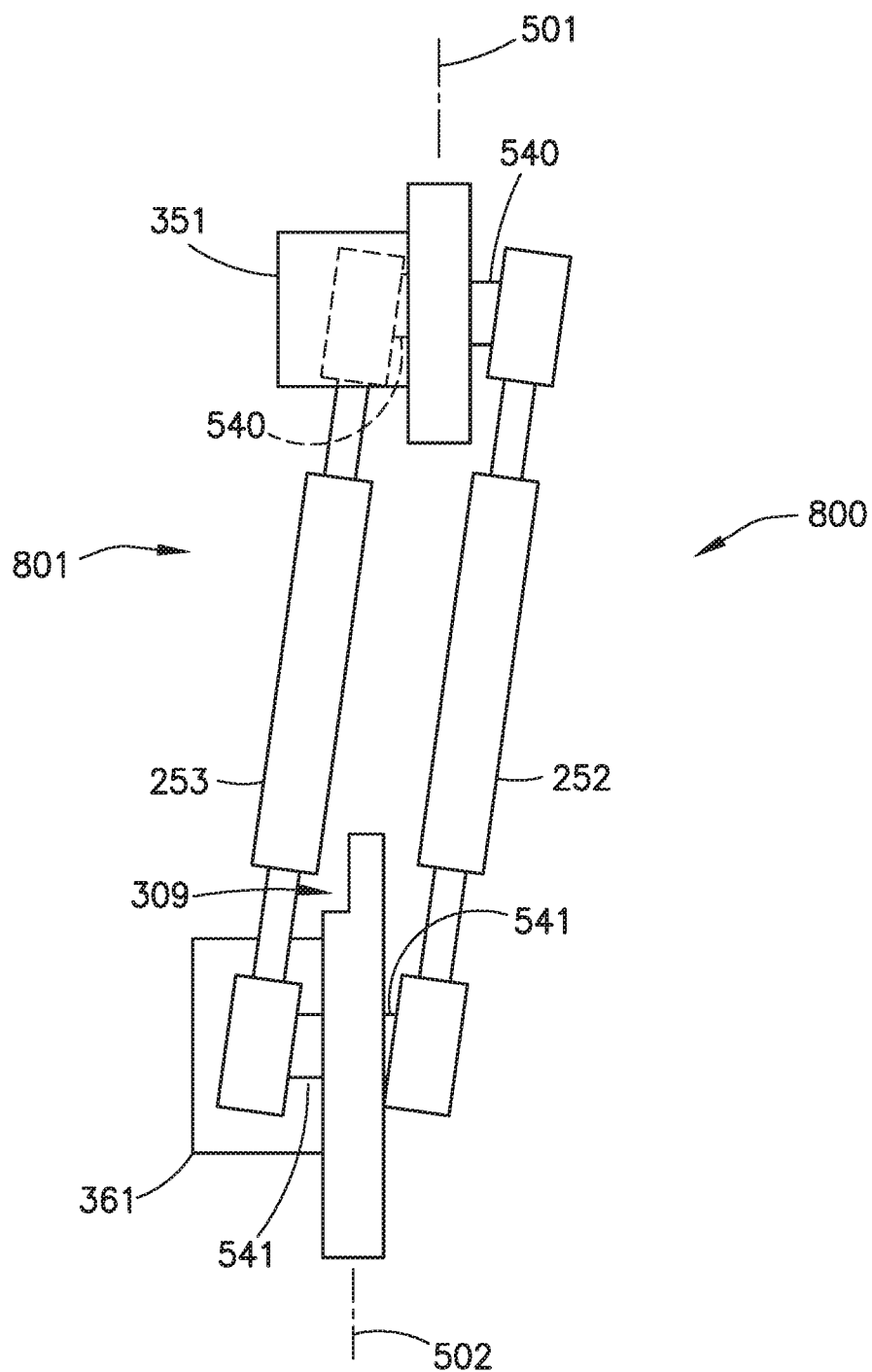
Figure 10:
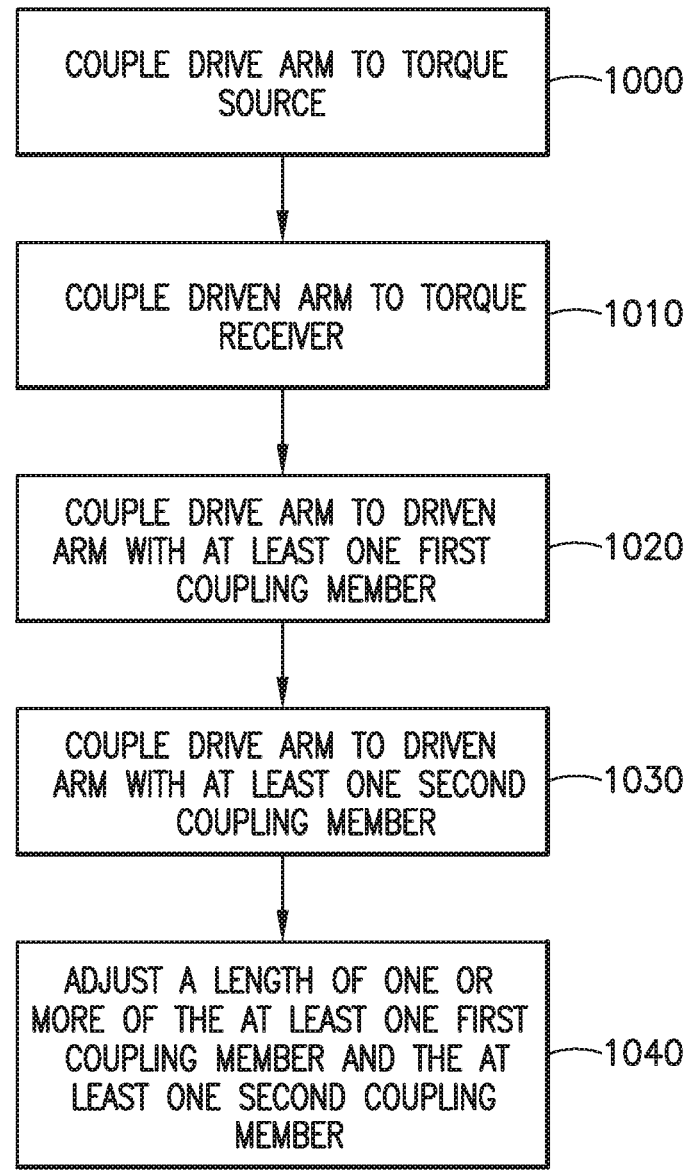

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a vehicle incorporating a drive train linkage in accordance with aspects of the present disclosure;

FIG. 2 is a schematic plan view of a gimballed member coupled to the vehicle and including the drive train linkage of FIG. 1 in accordance with aspects of the present disclosure;

FIG. 3 is a schematic plan view of the drive train linkage of FIG. 1 in accordance with aspects of the present disclosure;

FIG. 4 is a schematic side view of the drive train linkage of FIG. 1 in accordance with aspects of the present disclosure;

FIG. 5 is a schematic side view of the drive train linkage of FIG. 1 in accordance with aspects of the present disclosure;

FIGS. 6A and 6B (collectively referred to herein as FIG. 6) is a schematic "exploded" view of the drive train linkage of FIG. 1 in accordance with aspects of the present disclosure;

FIG. 7 is a schematic plan view of the drive train linkage of FIG. 1 in accordance with aspects of the present disclosure;

FIG. 8 is a schematic side view of the drive train linkage of FIG. 1 in accordance with aspects of the present disclosure;

FIG. 9 is a schematic side view of the drive train linkage of FIG. 1 in accordance with aspects of the present disclosure; and FIG. 10 is a block diagram of an exemplary method for transferring torque between a torque source and a torque receiver with the drive train linkage of FIG. 1 in accordance with aspects of the present disclosure.

DETAILED DESCRIPTION

Referring to FIGS. 1 and 2, the aspects of the present disclosure provide for a drive train linkage 180 that includes a drive arm 250, a driven arm 251, at least one (or more than one) first coupling member 252, and at least one (or more than one) second coupling member 253. The drive train linkage 180 couples an input shaft 151 and an output shaft 152 of a drive train 150 to each other with a substantially zero mechanical deadband coupling. As used herein, the substantially zero mechanical deadband coupling is a coupling where the same relative relationship between the input shaft 151 and output shaft 152 is substantially maintained without lost motion (e.g. mechanical deadband) such that any differential rotation (e.g., about a respective pivot axis in either a same rotation direction or an opposite rotation direction) between the drive arm 250 and driven arm 251 (and between the input shaft 151 and the output shaft 152) is negligible with respect to coupled rotation of the drive arm 250 and the driven arm 251. As used herein, mechanical deadband is a neutral zone or dead zone of movement in which a band of input movement in a control system (such as a drive train including an input shaft providing the input movement and an output shaft) where the output of the control system is substantially zero (e.g., the output is dead—no movement occurs). Examples of mechanical deadband include, but are not limited to backlash, and assembly gaps due to tolerance stack-ups between parts.

The substantially zero mechanical deadband coupling of the drive train linkage 180 is obtained by only a hand-tightening of one or more than one of the at least one first coupling member 252 and the at least one second coupling member 253. Hand-tightening as used herein is the application of a "snugging torque" of about 5 in-lb (about 0.6 N-m) to about 10 in-lb (about 1 N-m); while in other aspects more or less torque may be applied, such as up to about 30 in-lb (about 3.4 N-m) or greater.

The drive train linkage 180 may be deployed in any suitable drive train 150 to effect movement of any suitable drive axis 120. In one particular aspect, the drive axis 120 is a component of a gimbaled member 110 mounted to a vehicle 100. The vehicle 100 may be an aircraft, an automobile, a marine vessel, a spacecraft, or any combination thereof. While the vehicle 100 is described herein, the gimbaled member 110, in other aspects, may be mounted to a building, the Earth, or other fixed/stationary (relative to, e.g., the Earth) object. The gimbaled member 110 may be a telescope, a spot/search light, a laser or any other device that is pointed to a desired target for observing, illuminating, or interacting with the target in any suitable manner. FIG. 2 illustrates, for exemplary purposes, the application of the drive train linkage 180 to a gimbaled member 110 in the form of a search light 111. The search light 111 includes a base 200 coupled to the vehicle 100, a light support member 230 rotatably coupled to the base 200, and a light 240 rotatably coupled to the light support member 230. The light support member 230 rotates relative to the base 200 about axis 299 in direction 280 under motive force of any suitable drive axis 210. The light 240 rotates relative to the light support member 230 about axis 298 in direction 281 under motive force of any suitable drive axis 120. Here the drive axis 120 includes any suitable drive motor 220 having the input shaft 151. The drive axis also includes the output shaft 152 that is fixedly coupled to the light 240 for rotating the light in direction 281. The drive train linkage 180 couples the input shaft 151 to the output shaft 152 so that that the light 240 is pointed in direction 281 with increased accuracy and decreased vibration when compared to the pointing accuracy and vibration of gear trains, chains and sprockets, and belts and pulleys.

Referring to FIGS. 3 and 6, the drive train linkage 180 includes the drive arm 250, the driven arm 251, and a coupling system 300. The drive arm 250 has a drive arm pivot axis 301 which is coincident with a pivot axis 601 of the input shaft 151 (see FIG. 6). The drive arm pivot axis 301 is a one degree of freedom pivot axis. The driven arm 251 has a driven arm pivot axis 302 which is coincident with a pivot axis 602 of the output shaft 152. The driven arm pivot axis 302 is a one degree of freedom pivot axis. The drive arm pivot axis 301 and the driven arm pivot axis 302 define a longitudinal axis 399 of the drive train linkage 180.

The drive arm 250 includes a drive arm body 350 having a first drive coupling member 351, a first arm portion 352 extending from a first lateral side 398 of the first drive coupling member 351, and a second arm portion 353 extending from a second lateral side 397 of the first drive coupling member 351. The first drive coupling member 351 is disposed about the drive arm pivot axis 301 and is configured to couple the drive arm 250 to a torque source 699. The torque source 699 is the input shaft 151 or other suitable torque source including but not limited to motors. The first drive coupling member 351 includes for example, a spline receptacle 670, a square drive receptacle 677, a rectangular drive receptacle 671, a lemon drive receptacle 672, a star drive receptacle 673, etc. (or the converse a spline shaft, a square drive shaft, a rectangular drive shaft, a lemon drive shaft, a star drive shaft, etc.) that is complimentary to the drive configuration of the input shaft 151 (shown in FIG. 6 as a splined shaft for exemplary purposes). The first arm portion 352 includes a first coupling aperture 603 that defines a first coupling axis 605. The first coupling axis 605 is spaced from the drive arm pivot axis 301 by a predetermined distance 396. The second arm portion 353 includes a second coupling aperture 604 that defines a second coupling axis 606. The second coupling axis 606 is spaced from the drive arm pivot axis 301 by a predetermined distance 395, e.g., where the first coupling aperture 603 and the second coupling aperture 604 define a center-to-center coupling distance 394 of the at least one first coupling member 252 and the at least one second coupling member 253 to the drive arm 250. The predetermined distances 395, 396 may be the same or different so as to tailor a range of rotation of the drive train linkage 180.

The driven arm 251 includes a driven arm body 360 having a second drive coupling member 361, a first arm portion 362 extending from a first lateral side 388 of the second drive coupling member 361, and a second arm portion 363 extending from a second lateral side 387 of the second drive coupling member 361. The second drive coupling member 361 is disposed about the driven arm pivot axis 302 and is configured to couple the driven arm 251 to a torque receiver 698. The torque receiver 698 is the output shaft 152 or other suitable torque receiver. The second drive coupling member 361 includes for example, a spline receptacle 670, a square drive receptacle 677, a rectangular drive receptacle 671, a lemon drive receptacle 672, a star drive receptacle 673, etc. (or the converse a spline shaft, a square drive shaft, a rectangular drive shaft, a lemon drive shaft, a star drive shaft, etc.) that is complimentary to the drive configuration of the output shaft 152 (shown in FIG. 6 as a splined shaft for exemplary purposes).

The first arm portion 362 includes a third coupling aperture 613 that defines a third coupling axis 615. The third coupling axis 615 is spaced from the driven arm pivot axis 302 by a predetermined distance 386. The second arm portion 363 includes a fourth coupling aperture 614 that defines a fourth coupling axis 616. The fourth coupling axis 616 is spaced from the driven arm pivot axis 302 by a predetermined distance 385, e.g., where the third coupling aperture 613 and the fourth coupling aperture 614 define a center-to-center coupling distance 384 of the at least one first coupling member 252 and the at least one second coupling member 253 to the driven arm 251. The predetermined distances 385, 386 may be the same or different so as to tailor a range of rotation of the drive train linkage 180.

In one aspect, the center-to-center coupling distance 394 of the at least one first coupling member 252 and the at least one second coupling member 253 to the drive arm 250 is greater than the center-to-center coupling distance 384 of the at least one first coupling member 252 and the at least one second coupling member 253 to the driven arm 251 so as to reduce an amount of torque transmitted from the drive arm 250 to the driven arm 251. In another aspect, the center-tocenter coupling distance 394 of the at least one first coupling member 252 and the at least one second coupling member 253 to the drive arm 250 is less than the center-to-center coupling distance 384 of the at least one first coupling member 252 and the at least one second coupling member 253 to the driven arm 251 so as to increase an amount of torque transmitted from the drive arm 250 to the driven arm 251. In still another aspect, the center-to-center coupling distance 394 of the at least one first coupling member 252 and the at least one second coupling member 253 to the drive arm 250 is substantially the same as the center-to-center coupling distance 384 of the at least one first coupling member 252 and the at least one second coupling member 253 to the driven arm 251 so as to maintain an amount of torque transmitted from the drive arm 250 to the driven arm 251.

Still referring to FIGS. 3 and 6, In one aspect, the coupling system 300 includes the at least one (or more than one) first coupling member 252, and the at least one (or more than one) second coupling member 253; while in other aspects the coupling system 300 includes but (e.g., only) two coupling members 310 (e.g., a single first coupling member 252 and a single second coupling member 253). the at least one (or one or more) first coupling member 252 extends between and is rotatably coupled to each of the drive arm 250 and driven arm 251. The at least one (or one or more) second coupling member 253 extends between and is rotatably coupled to each of the drive arm 250 and driven arm 251 so that the at least one second coupling member 253 opposes the at least one first coupling member 252, where the at least one first coupling member 252 and the at least one second coupling member 253 are coupled to both the drive arm 250 and the driven arm 251 so to form a substantially zero mechanical deadband coupling 320 between the drive arm 250 and the driven arm 251.

Where there are but two coupling members 310, the first coupling member 252 includes a first end 401 and a second end 402; while the second coupling member 253 has a first end 411 and a second end 412. The first end 401 of the first coupling member 252 is rotatably coupled to the drive arm 250 at first coupling axis 605. The second end 402 of the first coupling member 252 is coupled to the driven arm 251 at a third coupling axis 615. The first end 421 of the second coupling member 253 is rotatably coupled to the drive arm 250 at second coupling axis 606. The second end 422 of the second coupling member 253 is coupled to the driven arm 251 at a fourth coupling axis 616. Coupling the first ends 401, 421 and the second ends 402, 422 of the first and second coupling members 252, 253 about the respective one of the first, second, third and fourth coupling axis 605, 606, 615, 616, respectively, provides for a multiple load path drive coupling (on opposite sides of the longitudinal axis 399) between the drive arm 250 and the driven arm 251 as well as counter (or opposing) tensioning between the first coupling member 252 and the second coupling member 253. In one aspect, the at least one first coupling member 252 and the at least one second coupling member are 253 disposed in a common plane 490; while in other aspects, the at least one first coupling member 252 and the at least one second coupling member are 253 disposed in multiple planes 490, 491 which may or may not be parallel to each other. Disposing the at least one first coupling member 252 and the at least one second coupling member are 253 may provide clearance for the drive train linkage 180 to operate around other structure of, e.g., the drive train 150 (FIG. 1) and/or drive axis 120 (FIG. 1).

Where there are more than one first coupling member 252, the first coupling member 252 includes a first coupler 400 and a second coupler 410. The first coupler 400 has the first end 401 and the second end 402. The second coupler 410 has a first end 411 and a second end 412. The first end 401 of the first coupler 400 and first end 411 of the second coupler 410 are rotatably coupled to the drive arm 250 at the first coupling axis 605 (which is a common axis of rotation for the first ends 401, 411). The second end 402 of the first coupler 400 and the second end 412 of the second coupler 410 are coupled to the driven arm 251 at the third coupling axis 615 (which is a common axis of rotation for the second ends 402, 412). Coupling the first ends 401, 411 and the second ends 402, 412 of the first and second coupler 400, 410 about the respective one of the first coupling axis 605 and the third coupling axis 615 provides for a multiple load path drive coupling (on a common side of the longitudinal axis 399) between the drive arm 250 and the driven arm 251. The at least one second coupling member 253 includes a third coupler 420 and a fourth coupler 430.

The third coupler 420 has the first end 421 and the second end 422. The fourth coupler 430 has a first end 431 and a second end 432. The first end 421 of the third coupler 420 and first end 431 of the fourth coupler 430 are rotatably coupled to the drive arm 250 at the second coupling axis 606 (which is a common axis of rotation for the first ends 421, 431). The second end 422 of the third coupler 420 and the second end 432 of the fourth coupler 430 are coupled to the driven arm 251 at the fourth coupling axis 616 (which is a common axis of rotation for the second ends 422, 432). Coupling the first ends 421, 431 and the second ends 422, 432 of the third and fourth coupler 420, 430 about the respective one of the second coupling axis 606 and the fourth coupling axis 616 provides for a multiple load path drive coupling (on a common side of the longitudinal axis 399) between the drive arm 250 and the driven arm 251. The third and fourth couplers 420, 430, together with the first and second couplers 400, 410, provide for quadruple load paths on opposite sides of the longitudinal axis 399 as well as counter (or opposing) tensioning between the first coupling member 252 and the second coupling member 253.

Still referring to FIGS. 3 and 6, the first ends 401, 421 (and first ends 411, 431) of the at least one first coupling member 252 and the at least one second coupling member 253 are rotatably coupled to the drive arm 250 at the respective first coupling axis 605 and second coupling axis 606 in any suitable manner, such as with respective pins 640, 641 that provide single degree of freedom movement (e.g., rotation about the respective first coupling axis 605 and second coupling axis 606 in a respective direction 316, 317). The single degree of freedom movement provided by the pins 640, 641 provide for placement of the drive arm 250 and the driven arm 251 in a common plane 492 (FIG. 4). Referring also to FIG. 5, in other aspects the first ends 401, 421 of the at least one first coupling member 252 and at least one second coupling member 253 are rotatably coupled to the drive arm 250 at the respective first coupling axis 605 and second coupling axis 606 with spherical/ball joints 540 that provide multiple degree of freedom movement (e.g., e.g., rotation about the respective first coupling axis 605 and second coupling axis 606 in a respective direction 316, 317 as well as rotation in respective directions 515 about ball joint axis of rotation 510.

Still referring to FIGS. 3 and 6, the second ends 402, 422 (and second ends 412, 432) of the at least one first coupling member 252 and the at least one second coupling member 253 are rotatably coupled to the drive arm 250 at the respective third coupling axis 615 and fourth coupling axis 616 in any suitable manner, such as with respective pins 643, 642 that provide single degree of freedom movement (e.g., rotation about the respective third coupling axis 615 and fourth coupling axis 616 in a respective direction 315, 314). While pins 640, 641 are illustrated on a single side of the drive arm 250 and driven arm 251 in FIG. 3, in other aspects pins 644, 645, 646, 647 may be provided on the opposite side (e.g., back side 801) of the drive arm 250 and driven arm 251 for coupling the second coupler 410 and fourth coupler 430 to the drive arm 250 and the driven arm 251 in the manner shown in FIG. 4 for providing the quadruple load paths. The single degree of freedom movement provided by the pins 643, 642 provide for placement of the drive arm 250 and the driven arm 251 in a common plane 492 (FIG. 4). Referring also to FIG. 5, in other aspects the second ends 402, 422 of the at least first coupling member 252 and at least one second coupling member 253 are rotatably coupled to the drive arm 250 at the respective third coupling axis 615 and fourth coupling axis 616 with spherical/ball joints 541 that provide multiple degree of freedom movement (e.g., rotation about the respective third coupling axis 615 and fourth coupling axis 616 in a respective direction 315, 314 as well as rotation in respective directions 516 about ball joint axis of rotation 511. While ball joints 540, 541 are illustrated on a single side of the drive arm 250 and driven arm 251 in FIG. 5, in other aspects ball joints may be provided on the opposite side of the drive arm 250 and driven arm 251 for coupling the second and fourth coupler 410, 430 to the drive arm 250 and the driven arm 251 in the manner shown in FIG. 4 so that the drive arm 250 and driven arm 251 may be located in offset planes 501, 502). The multiple degree of freedom movement provided by the ball joints 540, 541 provide for placement of the drive arm 250 and the driven arm 251 in offset planes 501, 502 that are offset from each other by any suitable distance 503.

The pins 640, 641, 642, 643 (and pins 644, 645, 646, 647) or ball joints 540, 541 may be coupled to the respective drive arm 250 and driven arm 251 in any suitable manner, such as with mechanical fasteners (e.g., clips 621, threads, etc.). In other aspects, the pins 640, 641, 642, 643 (and pins 644, 645, 646, 647) or ball joints 540, 541 may be integrally formed (as a unitary member) with the respective drive arm 250 and driven arm 251. The couplings between the pins 640, 641, 642, 643 (and pins 644, 645, 646, 647) or ball joints 540, 541 and the respective at least one first coupling member 252 and the at least one second coupling member 253 are such that the substantially zero mechanical deadband coupling 320 is thermally stable. For example, the joints between the pins 640, 641, 642, 643 (and pins 644, 645, 646, 647) or ball joints 540, 541 and the respective at least one first coupling member 252 and at least one second coupling member 253 are sized so as to have clearance that allows for the thermal expansion and contraction of the materials while the tension (as described herein) in the at least one first coupling member 252 and the at least one second coupling member 253 maintains substantially zero mechanical deadband.

The at least one first coupling member 252 and the at least one second coupling member 253 are substantially rigid links 372, 373; where the substantially rigid links 372, 373 are links that do not bend or flex (e.g., are un-jointed so as to remain straight) where any compression or extension of the coupling members 252, 253 due to material properties is negligible with respect to coupled rotation of the drive arm 250 and driven arm 251. In one aspect, at least one of the at least one first coupling member 252 and the at least second coupling 253 is configured to preload (e.g., both against each other and the torque source/receiver 699, 698 coupled to the drive arm 250 and driven arm 251) the substantially zero mechanical deadband coupling 320 between the drive arm 250 and the driven arm 251. For example, at least one of the at least one first coupling member 252 and the at least one second coupling member 253 has an adjustable length 376, 377. In other aspects, each of the at least one first coupling member 252 and the at least second coupling 253 is configured to preload (e.g., both against each other and the torque source/receiver 699, 698 coupled to the drive arm 250 and driven arm 251) the substantially zero mechanical deadband coupling 320 between the drive arm 250 and the driven arm 250. For example, each of the at least one first coupling member 252 and the at least one second coupling member 253 has an adjustable length 376, 377. The preload is as described above with respect to the hand-tightening of one or more than one of the at least one first coupling member 252 and the at least one second coupling member 253.

Referring to FIGS. 3 and 6, one or more of the at least one first coupling member 252 and the at least one second coupling member 253 includes a tensioning system 650 that effects preloading the drive train linkage 180 as well as provides for the adjustable length 376, 377. For example, the tensioning system 650 of the one or more of the at least one first coupling member 252 and the at least one second coupling member 253 includes a turnbuckle 631, a bottle-screw 632, or a tie rod 630. For exemplary purposes only, the tensioning system 650 will be described with respect to the tie rod 630, where the turnbuckle 631 and bottlescrew 632 include similar features. The tensioning system 650 includes a coupling nut 651 having a first end 652 and a second end 653. The coupling nut 651 includes internal (or external) threads 666 at the first end 652 and internal (or external) threads 667 at the second end 653. A clevis 654, 655 is threadably coupled to each respective end 652, 653 of the coupling nut 651, where each clevis 654, 655 includes external (or internal) threads 668, 669 that couple with a respective one of the threads 666, 667. The threads 666, 668 and the threads 667, 669 are opposite in hand so that as the coupling nut 651 is rotated about axis 690 the respective length 376, 377 of the at least one first coupling member 252 and the at least one second coupling member 253 increases or decreases, depending on a direction of rotation of the coupling nut 651 about the axis 690. In one aspect, the tensioning system is a locking tensioning system 691 that includes, for example a locking nut 656, 657 for each clevis 654, 655 that is disposed on the respective thread 668, 669 and is tightened against the coupling nut 651 to prevent relative rotation between the respective clevis 654, 655 and the coupling nut 651.

Referring to FIGS. 3, 4, 5, and 6, in one aspect, the at least one first coupling member 252 is substantially parallel with the at least one second coupling member 253 so that the drive arm and the driven arm rotate in a same direction (e.g., both clockwise or both counter-clockwise) about the respective drive arm pivot axis 301 and driven arm pivot axis 302. In other aspect, the at least one first coupling member 252 and the at least one second coupling member 253 may not be parallel but may be disposed so that the drive arm and the driven arm rotate in a same direction (e.g., both clockwise or both counter-clockwise) about the respective drive arm pivot axis 301 and driven arm pivot axis 302. For example, the at least one first coupling member 252 extends between and is rotatably coupled to each of the drive arm 250 and the driven arm 251 (as described above) on a first lateral side 398 of the respective drive arm pivot axis 301 and the driven arm pivot axis 302. The at least one second coupling member 253 extends between and is rotatably coupled to each of the drive arm 250 and the driven arm 251 (as described above) on a second lateral side 397 of the respective drive arm pivot axis 301 and the driven arm pivot axis 302.

Referring to FIGS. 7, 8, and 9, the at least one first coupling member 252 and the at least one second coupling member 253 cross one another (e.g., cross over the longitudinal axis 399) so that the drive arm 250 and the driven arm 251 rotate in opposite directions (e.g., the driven arm 251 rotates clockwise when the drive arm 250 rotates counter-clockwise; and the driven arm 251 rotates counter-clockwise when the drive arm 250 rotates clockwise). Rotation of the drive arm 250 and the driven arm 251 in opposite directions provides for a drive train 150 in which the input and output of the drive train 150 are move in opposite directions. In the aspect shown in FIGS. 7, 8, and 9, the at least one first coupling member 252 is disposed on a front side 800 of the drive train linkage 180 while the at least one second coupling member 253 is be disposed on the back side 801 of the drive train linkage 180 so as to avoid interference between the at least one first coupling member 252 and the at least one second coupling member 253. The at least one first coupling member 252 and the at least one second coupling member 253 are coupled to the drive arm 250 and driven arm 251 as described above so that the drive arm 250 and driven arm 251 are disposed in the common plane 492 or the offset planes 501, 502.

In one aspect, any suitable locking member 633 is provided to substantially prevent relative rotation between the drive arm 250 and the torque source 699. For example, the locking member 633 includes a locking bolt 608 that extends through the drive arm 250 to threadably couple with the torque source 699 so that the coupling between the locking bolt 608 and the torque source 699 substantially prevents relative movement between the drive arm 250 and torque source 699 that may otherwise be allowed by the drive arm 250 to torque source 699 coupling (e.g., spline coupling, etc.). Any suitable locking member 634 is also provided to substantially prevent relative rotation between the driven arm 251 and the torque receiver 698. For example, the locking member 634 includes a locking bolt 609 that extends through the driven arm 251 to threadably couple with the torque receiver 698 so that the coupling between the locking bolt 609 and the torque receiver 698 substantially prevents relative movement between the driven arm 251 and torque receiver 698 that may otherwise be allowed by the driven arm 251 to torque receiver 698 coupling (e.g., spline coupling, etc.). In other aspect, the locking members 633, 634 may be set screws, locking nuts, or any other suitable locking device configured to substantially prevent relative rotation between the drive arm 250 and the torque source 699, and between the driven arm 251 and the torque receiver 698.

Referring to FIGS. 3, 6, and 10 an exemplary method for transferring torque between the torque source 699 and a torque receiver 698 with the drive train linkage 180 will be described. The drive arm 250 is coupled to the torque source 699 (FIG. 10, Block 1000), where the drive arm 250 includes the drive arm pivot axis 301. Coupling the drive arm 250 to the torque source 699 provides for input motion to the drive train linkage 180. The driven arm 251 is coupled to the torque receiver 698 (FIG. 10, Block 1010), where the driven arm 251 includes the driven arm pivot axis 302. Coupling the driven arm 251 to the torque receiver 698 provides an output motion (corresponding to the input motion) of the torque receiver 698 through the drive train linkage 180. The drive arm 250 is coupled to the driven arm 251 with at least one first coupling member 252 (FIG. 10, Block 1020) so that the at least one first coupling member 252 extends between and is rotatably coupled to each of the drive arm 250 and driven arm 251. The drive arm 250 is coupled to the driven arm 251 with at least one second coupling member 253 (FIG. 10, Block 1030) so that the at least one second coupling member 253 extends between and is rotatably coupled to each of the drive arm 250 and driven arm 251. Coupling the drive arm 250 and the driven arm 251 with the at least one first coupling member 252 and the at least one second coupling member 253 provides for coupling rotation of the drive arm 250 to the driven arm 251. In one aspect, the drive arm 250 and the driven arm 251 rotate in a same direction; while in other aspects the drive arm 250 and the driven arm 251 rotate in opposite directions. A length of one or more of the at least one first coupling member 252 and the at least one second coupling member 253 is adjusted (FIG. 10, Block 1040) so as to form the substantially zero mechanical deadband coupling 320 between the drive arm 250 and the driven arm 251. Adjusting one or more of the at least one first coupling member 252 and the at least one second coupling member 253 preloads the substantially zero mechanical deadband coupling between the drive arm and the driven arm. In the method, an amount of torque transfer between the drive arm 250 and the driven arm 251 may be decreased wherein the center-to-center coupling distance 394 of the at least one first coupling member 252 and the at least one second coupling member 253 to the drive arm 250 is greater than another center-to-center coupling distance 384 of the at least one first coupling member 252 and the at least one second coupling member 253 to the driven arm 251. The amount of torque transfer between the drive arm 250 and the driven arm 251 may be increased where the center-to-center coupling distance 394 of the at least one first coupling member 252 and the at least one second coupling member 253 to the drive arm 250 is less than another center-to-center coupling distance 384 of the at least one first coupling member 252 and the at least one second coupling member 253 to the driven arm 251.

In the aspects of the present disclosure described herein, any suitable clearance 309 (see FIGS. 3, 5, 6, 7, and 9) may be provided on the surfaces of the drive arm 250 and/or driven arm 251 to provide for unhindered relative movement between the drive arm 250, the driven arm 251, the at least one first coupling member 252, and the at least one second coupling member 253. Any suitable anti-friction coatings may also be provided at the rotary joints between the drive arm 250 and/or the driven arm 251, the at least one first coupling member 252, and the at least one second coupling member 253.

The following are provided in accordance with the aspects of the present disclosure:

A1. A drive train linkage comprising:
a drive arm having a drive arm pivot axis;
a driven arm having a driven arm pivot axis;
at least one first coupling member extending between and being rotatably coupled to each of the drive arm and driven arm; and
at least one second coupling member extending between and being rotatably coupled to each of the drive arm and driven arm so that the at least one second coupling member opposes the at least one first coupling member;
where the at least one first coupling member and the at least one second coupling member are coupled to both the drive arm and the driven arm so to form a substantially zero mechanical deadband coupling between the drive arm and the driven arm.

A2. The drive train linkage of paragraph A1, wherein the at least one first coupling member and the at least one second coupling member are disposed in a common plane.

A3. The drive train linkage of paragraph A1, wherein the at least one first coupling member and the at least one second coupling member are substantially rigid links.

A4. The drive train linkage of paragraph A1, where at least one of the at least one first coupling member and the at least one second coupling member has an adjustable length.

A5. The drive train linkage of paragraph A1, wherein each of the at least one first coupling member and the at least one second coupling member has an adjustable length.

A6. The drive train linkage of paragraph A1, wherein at least one of the at least one first coupling member and the at least one second coupling member is configured to preload the substantially zero mechanical deadband coupling between the drive arm and the driven arm.

A7. The drive train linkage of paragraph A1, wherein each of the at least one first coupling member and the at least one second coupling member is configured to preload the substantially zero mechanical deadband coupling between the drive arm and the driven arm.

A8. The drive train linkage of paragraph A1, wherein a center-to-center coupling distance of the at least one first coupling member and the at least one second coupling member to the drive arm is greater than another center-to-center coupling distance of the at least one first coupling member and the at least one second coupling member to the driven arm.

A9. The drive train linkage of paragraph A1, wherein a center-to-center coupling distance of the at least one first coupling member and the at least one second coupling member to the drive arm is less than another center-to-center coupling distance of the at least one first coupling member and the at least one second coupling member to the driven arm.

A10. The drive train linkage of paragraph A1, wherein a center-to-center coupling distance of the at least one first coupling member and the at least one second coupling member to the drive arm is substantially the same as another center-to-center coupling distance of the at least one first coupling member and the at least one second coupling member to the driven arm.

A11. The drive train linkage of paragraph A1, wherein the drive arm includes a first drive coupling member disposed about the drive arm pivot axis, the first drive coupling member being configured to couple the drive arm to a torque source.

A12. The drive train linkage of paragraph A1, wherein the driven arm includes a second drive coupling member disposed about the driven arm pivot axis, the second drive coupling member being configured to couple the driven arm to a torque receiver.

A13. The drive train linkage of paragraph A1, wherein the drive arm pivot axis is a one degree of freedom pivot axis.

A14. The drive train linkage of paragraph A1, wherein the driven arm pivot axis is a one degree of freedom pivot axis.

A15. The drive train linkage of paragraph A1, wherein the at least one first coupling member is rotatably coupled to each of the drive arm and driven arm by respective pins.

A16. The drive train linkage of paragraph A1, wherein the at least one first coupling member is rotatably coupled to each of the drive arm and driven arm by respective ball joints.

A17. The drive train linkage of paragraph A1, wherein the at least one second coupling member is rotatably coupled to each of the drive arm and driven arm by respective pins.

A18. The drive train linkage of paragraph A1, wherein the at least one second coupling member is rotatably coupled to each of the drive arm and driven arm by respective ball joints.

A19. The drive train linkage of paragraph A1, wherein one or more of the at least one first coupling member and the at least one second coupling member comprise a tensioning system.

A20. The drive train linkage of paragraph A19, wherein the tensioning system comprises a turnbuckle, a bottlescrew, or a tie rod.

A21. The drive train linkage of paragraph A19, wherein the tensioning system comprises a coupling nut and a clevis threadably coupled to each respective end of the coupling nut.

A22. The drive train linkage of paragraph A19, wherein the tensioning system comprises a locking tensioning system.

A23. The drive train linkage of paragraph A1, wherein the at least one first coupling member extends between and is rotatably coupled to each of the drive arm and the driven arm on a first side of the respective drive arm pivot axis and the driven arm pivot axis.

A24. The drive train linkage of paragraph A1, wherein the at least one second coupling member extends between and is rotatably coupled to each of the drive arm and the driven arm on a second side of the respective drive arm pivot axis and the driven arm pivot axis.

A25. The drive train linkage of paragraph A1, wherein the substantially zero mechanical deadband coupling is thermally stable.

A26. The drive train linkage of paragraph A1, wherein the at least one first coupling member is substantially parallel with the at least one second coupling member so that the drive arm and the driven arm rotate in a same direction.

A27. The drive train linkage of paragraph A1, wherein the at least one first coupling member and the at least one second coupling member cross one another so that the drive arm and the driven arm rotate in opposite directions.

A28. The drive train linkage of paragraph A1, wherein the at least one first coupling member comprises:
a first coupler having a first end and a second end; and
a second coupler having a first end and a second end;
wherein the first ends of the first coupler and the second coupler are rotatably coupled to the drive arm at first common axis of rotation and the second ends of the first coupler and the second coupler are coupled to the driven arm at a second common axis of rotation.

A29. The drive train linkage of paragraph A1, wherein the at least one second coupling member comprises:
a third coupler having a first end and a second end; and
a fourth coupler having a first end and a second end;
wherein the first ends of the third coupler and the fourth coupler are rotatably coupled to the drive arm at third common axis of rotation and the second ends of the third coupler and the fourth coupler are coupled to the driven arm at a fourth common axis of rotation.

B1. A drive train linkage comprising:
a drive arm having a drive arm pivot axis;
a driven arm having a driven arm pivot axis, the drive arm pivot axis and the driven arm pivot axis defining longitudinal axis of the drive train linkage; and
a coupling system having but two coupling members, each of the but two coupling members extending between and being coupled to both the drive arm and driven arm, where the but two coupling members form a substantially zero mechanical deadband coupling between the drive arm and the driven arm.

B2. The drive train linkage of paragraph B1, wherein a first coupling member of the but two coupling members is disposed on one side of the longitudinal axis and a second coupling member of the but two coupling members is disposed on another side of the longitudinal axis so that the drive arm and the driven arm rotate in a same direction.

B3. The drive train linkage of paragraph B1, wherein each of a first coupling member and a second coupling member of the but two coupling members crosses the longitudinal axis so that the drive arm and the driven arm rotate in opposite directions.

B4. The drive train linkage of paragraph B1, wherein the but two coupling members are disposed in a common plane.

B5. The drive train linkage of paragraph B1, wherein the but two coupling members are substantially rigid links.

B6. The drive train linkage of paragraph B1, where at least one of the but two coupling members has an adjustable length.

B7. The drive train linkage of paragraph B1, wherein each of the but two coupling members has an adjustable length.

B8. The drive train linkage of paragraph B1, wherein at least one of the but two coupling members is configured to preload the substantially zero mechanical deadband coupling between the drive arm and the driven arm.

B9. The drive train linkage of paragraph B1, wherein each of the but two coupling members is configured to preload the substantially zero mechanical deadband coupling between the drive arm and the driven arm.

B10. The drive train linkage of paragraph B1, wherein the but two coupling members include a first coupling member and a second coupling member, and a center-to-center coupling distance of the first coupling member and the second coupling member to the drive arm is greater than another center-to-center coupling distance of the first coupling member and the second coupling member to the driven arm.

B11. The drive train linkage of paragraph B1, wherein the but two coupling members include a first coupling member and a second coupling member, and a center-to-center coupling distance of the first coupling member and the second coupling member to the drive arm is less than another center-to-center coupling distance of the first coupling member and the second coupling member to the driven arm.

B12. The drive train linkage of paragraph B1, wherein the but two coupling members include a first coupling member and a second coupling member, and a center-to-center coupling distance of the first coupling member and the second coupling member to the drive arm is substantially the same as another center-to-center coupling distance of the first coupling member and the second coupling member to the driven arm.

B13. The drive train linkage of paragraph B, wherein the drive arm includes a first drive coupling member disposed about the drive arm pivot axis, the first drive coupling member being configured to couple the drive arm to a torque source.

B14. The drive train linkage of paragraph B1, wherein the driven arm includes a second drive coupling member disposed about the driven arm pivot axis, the second drive coupling member being configured to couple the driven arm to a torque receiver.

B15. The drive train linkage of paragraph B1, wherein the drive arm pivot axis is a one degree of freedom pivot axis.

B16. The drive train linkage of paragraph B1, wherein the driven arm pivot axis is a one degree of freedom pivot axis.

B17. The drive train linkage of paragraph B1, wherein the but two coupling members are rotatably coupled to each of the drive arm and driven arm by respective pins.

B18. The drive train linkage of paragraph B1, wherein the but two coupling members are rotatably coupled to each of the drive arm and driven arm by respective ball joints.

B19. The drive train linkage of paragraph B1, wherein one or more of the but two coupling members comprise a tensioning system.

B20. The drive train linkage of paragraph B19, wherein the tensioning system comprises a turnbuckle, a bottlescrew, or a tie rod.

B21. The drive train linkage of paragraph B19, wherein the tensioning system comprises a coupling nut and a clevis threadably coupled to each respective end of the coupling nut.

B22. The drive train linkage of paragraph B19, wherein the tensioning system comprises a locking tensioning system.

B23. The drive train linkage of paragraph B1, wherein the substantially zero mechanical deadband coupling is thermally stable.

C1. A method for transferring torque between a torque source and a torque receiver with a drive train linkage, the method comprising:
coupling a drive arm to the torque source, where the drive arm includes a drive arm pivot axis;
coupling a driven arm to the torque receiver, where the driven arm includes a driven arm pivot axis;
coupling the drive arm to the driven arm with at least one first coupling member so that the at least one first coupling member extends between and is rotatably coupled to each of the drive arm and driven arm;
coupling the drive arm to the driven arm with at least one second coupling member so that the at least one second coupling member extends between and is rotatably coupled to each of the drive arm and driven arm; and
adjusting a length of one or more of the at least one first coupling member and the at least one second coupling member so as to form a substantially zero mechanical deadband coupling between the drive arm and the driven arm.

C2. The method of paragraph C1, further comprising preloading, with at least one of the at least one first coupling member and the at least second coupling, the substantially zero mechanical deadband coupling between the drive arm and the driven arm.

C3. The method of paragraph C1, further comprising decreasing an amount of torque transfer between the drive arm and the driven arm wherein a center-to-center coupling distance of the at least one first coupling member and the at least one second coupling member to the drive arm is greater than another center-to-center coupling distance of the at least one first coupling member and the at least one second coupling member to the driven arm.

C4. The method of paragraph C1, further comprising increasing an amount of torque transfer between the drive arm and the driven arm wherein a center-to-center coupling distance of the at least one first coupling member and the at least one second coupling member to the drive arm is less than another center-to-center coupling distance of the at least one first coupling member and the at least one second coupling member to the driven arm.

C5. The method of paragraph C1, wherein the drive arm and the driven arm rotate in a same direction.

C6. The method of paragraph C1, wherein the drive arm and the driven arm rotate in opposite directions.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A drive train linkage comprising:
 a drive arm having a drive arm body defining a drive arm pivot axis, where the drive arm body is a rigid member and pivots about the drive arm pivot axis;
 a driven arm having a driven arm body defining a driven arm pivot axis, where the driven arm body is a rigid member and pivots about the driven arm pivot axis under impetus of the drive arm;

at least one first coupling member extending between and being rotatably coupled to each of the drive arm and driven arm; and at least one second coupling member extending between and being rotatably coupled to each of the drive arm and driven arm so that forces exerted on both the drive arm and driven arm by the at least one second coupling member oppose forces exerted on both the drive arm and the driven arm by the at least one first coupling member;

where the at least one first coupling member and the at least one second coupling member are coupled to both the drive arm and the driven arm so to form a substantially zero mechanical deadband coupling between the drive arm and the driven arm.

2. The drive train linkage of claim 1, where at least one of the at least one first coupling member and the at least one second coupling member has an adjustable length.

3. The drive train linkage of claim 1, wherein each of the at least one first coupling member and the at least one second coupling member has an adjustable length.

4. The drive train linkage of claim 1, wherein at least one of the at least one first coupling member and the at least one second coupling member is configured to preload the substantially zero mechanical deadband coupling between the drive arm and the driven arm.

5. The drive train linkage of claim 1, wherein each of the at least one first coupling member and the at least one second coupling member is configured to preload the substantially zero mechanical deadband coupling between the drive arm and the driven arm.

6. The drive train linkage of claim 1, wherein one or more of the at least one first coupling member and the at least one second coupling member comprise a tensioning system.

7. The drive train linkage of claim 1, wherein the substantially zero mechanical deadband coupling is thermally stable.

8. The drive train linkage of claim 1, wherein the at least one first coupling member is substantially parallel with the at least one second coupling member so that the drive arm and the driven arm rotate in a same direction.

9. The drive train linkage of claim 1, wherein the at least one first coupling member and the at least one second coupling member cross one another so that the drive arm and the driven arm rotate in opposite directions.

10. A drive train linkage comprising:
a drive arm having a drive arm body defining a drive arm pivot axis, where the drive arm body is a rigid member and pivots about the drive arm pivot axis;
a driven arm having a driven arm body defining a driven arm pivot axis, the driven arm body is a rigid member and pivots about the driven arm pivot axis under impetus of the drive arm, the drive arm pivot axis and the driven arm pivot axis define a longitudinal axis of the drive train linkage; and
a coupling system having but two coupling members, each of the but two coupling members extending between and being coupled to both the drive arm and driven arm so that forces exerted on each of the drive arm and driven arm by the at least one second coupling member oppose forces exerted on each the drive arm and the driven arm by the at least one first coupling member, where the but two coupling members form a substantially zero mechanical deadband coupling between the drive arm and the driven arm.

11. The drive train linkage of claim 10, wherein a first coupling member of the but two coupling members is disposed on one side of the longitudinal axis and a second coupling member of the but two coupling members is disposed on another side of the longitudinal axis so that the drive arm and the driven arm rotate in a same direction.

12. The drive train linkage of claim 10, wherein each of a first coupling member and a second coupling member of the but two coupling members crosses the longitudinal axis so that the drive arm and the driven arm rotate in opposite directions.

13. The drive train linkage of claim 10, wherein the but two coupling members are disposed in a common plane.

14. The drive train linkage of claim 10, wherein the but two coupling members include a first coupling member and a second coupling member, and a center-to-center coupling distance of the first coupling member and the second coupling member to the drive arm is greater than another center-to-center coupling distance of the first coupling member and the second coupling member to the driven arm.

15. The drive train linkage of claim 10, wherein the but two coupling members include a first coupling member and a second coupling member, and a center-to-center coupling distance of the first coupling member and the second coupling member to the drive arm is less than another center-to-center coupling distance of the first coupling member and the second coupling member to the driven arm.

16. The drive train linkage of claim 10, wherein the but two coupling members include a first coupling member and a second coupling member, and a center-to-center coupling distance of the first coupling member and the second coupling member to the drive arm is substantially the same as another center-to-center coupling distance of the first coupling member and the second coupling member to the driven arm.

17. The drive train linkage of claim 10, wherein the drive arm includes a first drive coupling member disposed about the drive arm pivot axis, the first drive coupling member being configured to couple the drive arm to a torque source.

18. The drive train linkage of claim 10, wherein the driven arm includes a second drive coupling member disposed about the driven arm pivot axis, the second drive coupling member being configured to couple the driven arm to a torque receiver.

19. A method for transferring torque between a torque source and a torque receiver with the drive train linkage of claim 1, the method comprising:
coupling the drive arm to the torque source, where the drive arm includes the drive arm pivot axis;
coupling the driven arm to the torque receiver, where the driven arm includes the driven arm pivot axis;
coupling the drive arm to the driven arm with the at least one first coupling member so that the at least one first coupling member extends between and is rotatably coupled to each of the drive arm and driven arm;
coupling the drive arm to the driven arm with the at least one second coupling member so that the at least one second coupling member extends between and is rotatably coupled to each of the drive arm and driven arm; and
adjusting a length of one or more of the at least one first coupling member and the at least one second coupling member so as to form the substantially zero mechanical deadband coupling between the drive arm and the driven arm.

20. The method of claim 19, further comprising preloading, with at least one of the at least one first coupling member and the at least one second coupling member, the substantially zero mechanical deadband coupling between the drive arm and the driven arm.

* * * * *